(12) United States Patent
Kile

(10) Patent No.: US 10,864,953 B2
(45) Date of Patent: Dec. 15, 2020

(54) LUBRICATING OIL MAINTENANCE CAP ASSEMBLY WITH THERMALLY RESISTANT SHIELD

(71) Applicant: Kevin J. Kile, Spokane, WA (US)

(72) Inventor: Kevin J. Kile, Spokane, WA (US)

( * ) Notice: Subject to any disclaimer, the term of this patent is extended or adjusted under 35 U.S.C. 154(b) by 196 days.

(21) Appl. No.: 15/997,561

(22) Filed: Jun. 4, 2018

(65) Prior Publication Data

US 2019/0367109 A1 Dec. 5, 2019

(51) Int. Cl.
*B62D 55/092* (2006.01)
*B65D 41/02* (2006.01)

(52) U.S. Cl.
CPC ......... *B62D 55/092* (2013.01); *B65D 41/023* (2013.01)

(58) Field of Classification Search
CPC ................ B62D 55/092; B65D 41/023; F01M 2011/0491
See application file for complete search history.

(56) References Cited

U.S. PATENT DOCUMENTS

| | | | |
|---|---|---|---|
| 9,615,693 B1 * | 4/2017 | Merritt | A47J 37/0786 |
| 2008/0227905 A1 * | 9/2008 | Kumasaki | C08F 293/005 524/505 |
| 2013/0320752 A1 * | 12/2013 | Kile | B62D 55/15 305/100 |
| 2014/0116808 A1 * | 5/2014 | Kile | F16N 29/02 184/108 |
| 2014/0292067 A1 * | 10/2014 | Kile | B62D 55/092 305/119 |
| 2016/0222588 A1 * | 8/2016 | Sorrentino | D21F 5/181 |

* cited by examiner

*Primary Examiner* — Don M Anderson
(74) *Attorney, Agent, or Firm* — Parsons & Goltry, PLLC; Michael W. Goltry; Robert A. Parsons

(57) ABSTRACT

A lubricating oil maintenance cap assembly includes a cap having an outer side, and an inner side, a shield, anchor assemblies, the shield is applied to the inner side of the cap, and the anchor assemblies anchor the shield to the cap. The cap is fashioned of a first material, the shield is fashioned of a second material, and the second material is different from the first material and is more thermally resistant than the first material enabling the shield to thermally shield the inner side of the cap.

10 Claims, 4 Drawing Sheets

LUBRICATING OIL MAINTENANCE CAP ASSEMBLY WITH THERMALLY RESISTANT SHIELD

FIELD OF THE INVENTION

The present invention relates generally to tracked vehicles and, more particularly, to lubricating oil maintenance caps used to cap oil reservoirs of rollers of tracked vehicles.

BACKGROUND OF THE INVENTION

A crawler-type or tracked vehicle is supported and propelled by an undercarriage assembly having an endless track entrained about a drive roller or sprocket, a front idler roller, a rear idler roller, and a series of track rollers. The drive roller or sprocket is driven by an engine of the work vehicle which, in turn, advances the endless track around each of the front and rear idler rollers as well as the track rollers to advance the work vehicle.

For an endless track to function properly, it must be properly tensioned around the several rollers, and the several rollers must be properly maintained to ensure they roll with the least amount of friction while supporting the weight of the vehicle. Tracked vehicles are heavy. As a result, the rollers are prone to generate substantial frictional heat as they are made to roll as the tracked vehicle advances. Excessive frictional heat in the rollers can lead to roller failure and expensive and time-consuming repair costs. Limiting frictional heat in rollers is accomplished with a lubricating oil, which is applied to and maintained by lubricating oil reservoirs formed in the rollers. The lubricating oil must be periodically replenished, and periodically replaced to ensure the oil functions properly, namely, that it reduces roller friction and draws and dissipates heat away from the rollers. Contaminated or dirty oil and reduced oil levels impede the ability of the oil to reduce friction and dissipate heat. Accordingly, proper oil maintenance in rollers is essential for proper operation of the tracked vehicle and to limit unnecessary and time-consuming roller repairs.

The rollers of tracked vehicles are often fashioned with caps that close the open ends of the rollers that lead to the lubricating oil reservoirs. These caps are removably coupled to the rollers, such as with bolts or clamps, to enable skilled workers to access the lubricating oil reservoirs for facilitating the replenishment and replacement of the lubricating oil in the lubricating reservoirs. Many caps are now fashioned of transparent plastic to enable skilled workers to visually inspect the lubricating oil level and quality for quickly determining whether the lubricating oil requires replenishment or replacement. Although implementation of transparent, plastic caps is now widespread, it has been noticed that the heat generated by the rollers of some tracked vehicles softens the plastic of the caps resulting in unwanted oil leakage and the necessity of having to frequently replace the caps.

SUMMARY OF THE INVENTION

According to the principle of the invention, a lubricating oil maintenance cap assembly includes a cap including an outer side and an inner side, a shield, anchor assemblies, the shield is applied to the inner side of the cap, and the anchor assemblies anchor the shield to the cap. The cap is fashioned of a first material, the shield is fashioned of a second material, and the second material is different from the first material and is more thermally resistant than the first material enabling the shield to thermally shield the inner side of the cap. The first material is a first plastic material, the second material is a second plastic material, and the second plastic material is different from the first plastic material. The cap is a single unit molded of the first plastic material, and the shield is a single unit molded of the second plastic material. Each anchor assembly includes a countersunk hole of the cap and a counterpin of the shield. The countersunk hole includes a hole and a countersink, the counterpin includes a shank and a counterhead, the hole extends from the inner side of the cap to the countersink, the countersink extends from the hole to the outer side of the cap, the shank extends through the hole from the shield to the counterhead, and the counterhead is seated in the countersink.

According to the principle of the invention, a lubricating oil maintenance cap assembly includes a cap including an outer side and an inner side having a recessed seat, a shield, anchor assemblies, the shield is applied to the recessed seat, and the anchor assemblies anchor the shield to the recessed seat. The cap is fashioned of a first material, the shield is fashioned of a second material, and the second material is different from the first material and is more thermally resistant than the first material enabling the shield to thermally shield the inner side of the cap. The first material is a first plastic material, the second material is a second plastic material, and the second plastic material is different from the first plastic material. The cap is a single unit molded of the first plastic material, and the shield is a single unit molded of the second plastic material. Each anchor assembly includes a countersunk hole of the cap and a counterpin of the shield. The countersunk hole includes a hole and a countersink, the counterpin includes a shank and a counterhead, the hole extends from the recessed seat of the cap to the countersink, the countersink extends from the hole to the outer side of the cap, the shank extends through the hole from the shield to the counterhead, and the counterhead is seated in the countersink.

BRIEF DESCRIPTION OF THE DRAWINGS

Referring to the drawings.

DETAILED DESCRIPTION

A typical and well-known articulating tractor useful for drawing cultivating implements for mechanized cultivating operations includes an operator cab supported by a chassis, a front or leading end, and an opposed rear or trailing end formed with mechanical and hydraulic couplings used to operatively couple selected cultivating implements as is known in the art. The tractor, a type of a tracked vehicle, is formed with track assemblies operational for propelling the tractor. Typically, the tractor has four identical track assemblies including left front, right front, left rear, and right rear track assemblies, which are secured to the chassis in a known manner. Each track assembly includes a drive roller, a front idler roller, a rear idler roller, and track rollers as is known in the art, about which there is entrained an endless track. The various rollers are identical in structure but are normally sized differently. As a matter of example, the drive roller is larger than the front and rear idler rollers, which are identical in size, and the front and rear idler rollers are larger than the track rollers, which are identical in size. As known in the art, the drive roller is connected to the engine drive train of the tractor and engages the endless track to cause translation of the endless track when the drive roller is rotated by the engine. The drive roller may have teeth that engage within recesses in the endless track. Alternatively, the endless track may have teeth that are engaged within recesses in the drive roller. In either configuration, the drive roller can be rotated in either a clockwise or a counterclockwise direction to move the tractor in either a forward or reverse direction. In this regard, the tractor is driven by the endless tracks of the various track assemblies to advance the tractor. The rollers of tracked vehicles generate heat during operation. The various rollers of the track assemblies are identical in structure and each of them has an open end that leads to or otherwise communicates with a lubricating oil reservoir that maintains a volume of a lubricating oil, which provides lubrication to reduce roller friction and draw and dissipate heat away from the roller. It is to be understood that the specific construction of the tractor discussed briefly above is not relevant to the present invention, and the present invention discussed in the balance of this disclosure may be used with any type of vehicle that is propelled using one or more tracks driven by one or more roller systems like that of the tractor discussed briefly above.

Figure 1:
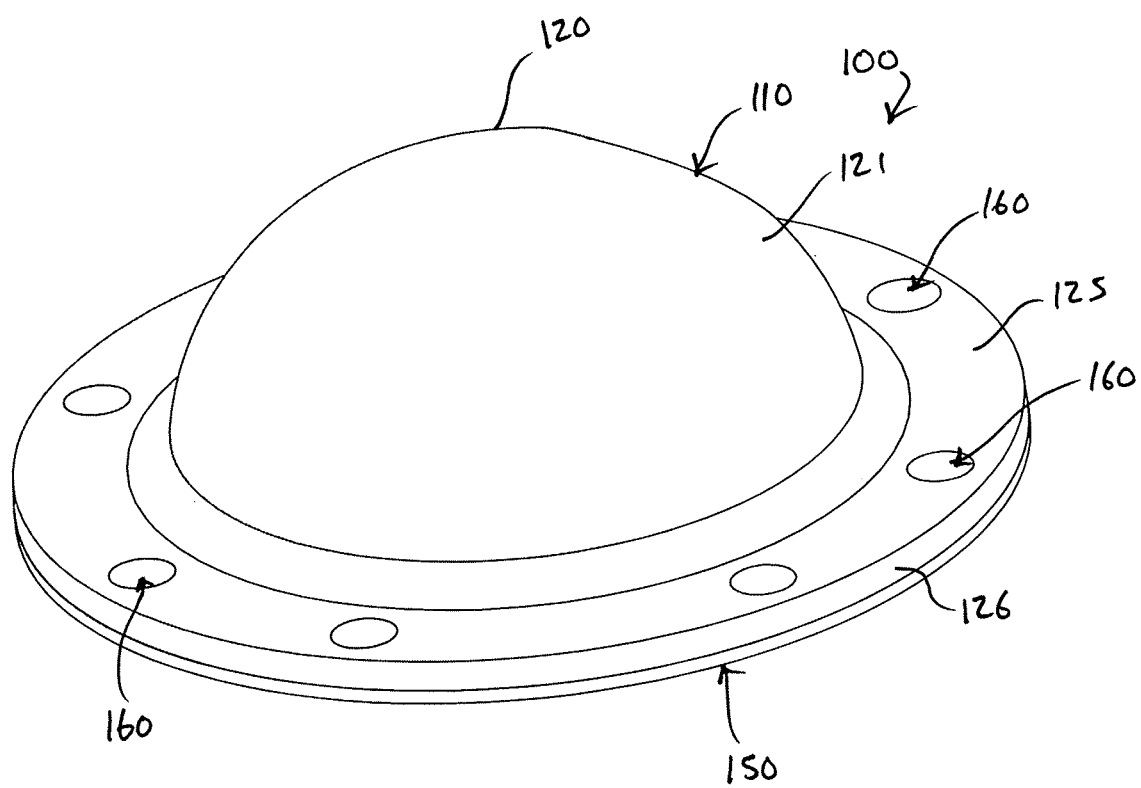
FIG. 1 is a perspective view of a lubricating oil maintenance cap assembly including a cap having an outer side, an inner side, and a shield anchored to the inner side of the cap.

Turning now to the drawings, in which like reference characters indicate corresponding elements throughout the several views, attention is first directed to FIG. 1 illustrating a lubricating oil maintenance cap assembly 100 constructed and arranged in accordance with the principle of the invention is illustrated. Cap assembly 100 is used to enclose the lubricating oil reservoir of a roller of a tracked vehicle. Cap assembly 100 is adapted to be removably secured or otherwise coupled to the open end of a lubricating oil reservoir of a roller of a tracked vehicle for closing the open end of the lubricating oil reservoir for enclosing and sealing the volume of lubricating oil in the lubricating oil reservoir, and at the same time provides visual access into the lubricating oil reservoir for lubricating oil level and quality monitoring purposes.

Figure 2:
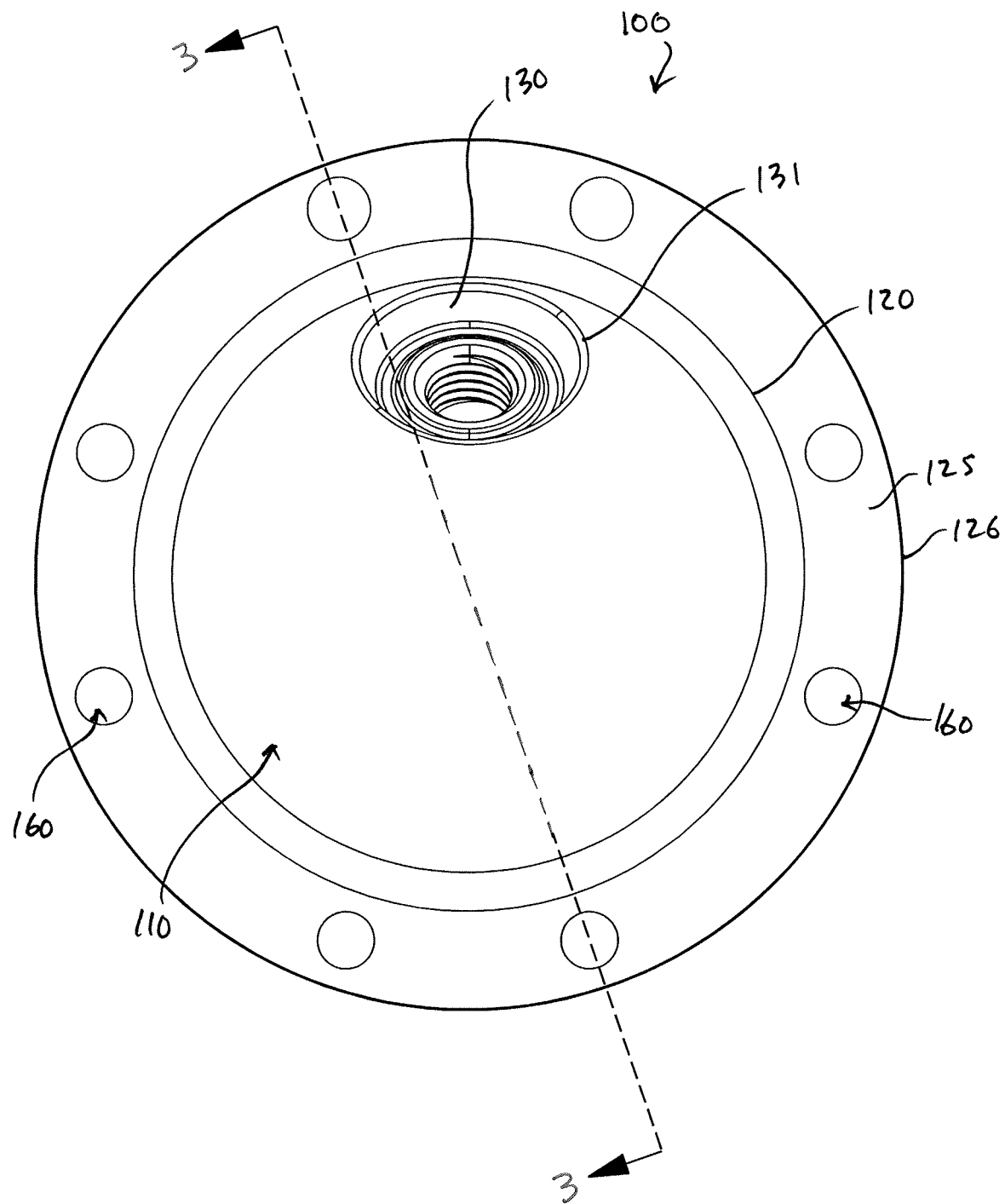
FIG. 2 is a top plan view of the embodiment of FIG. 1.
Figure 3:
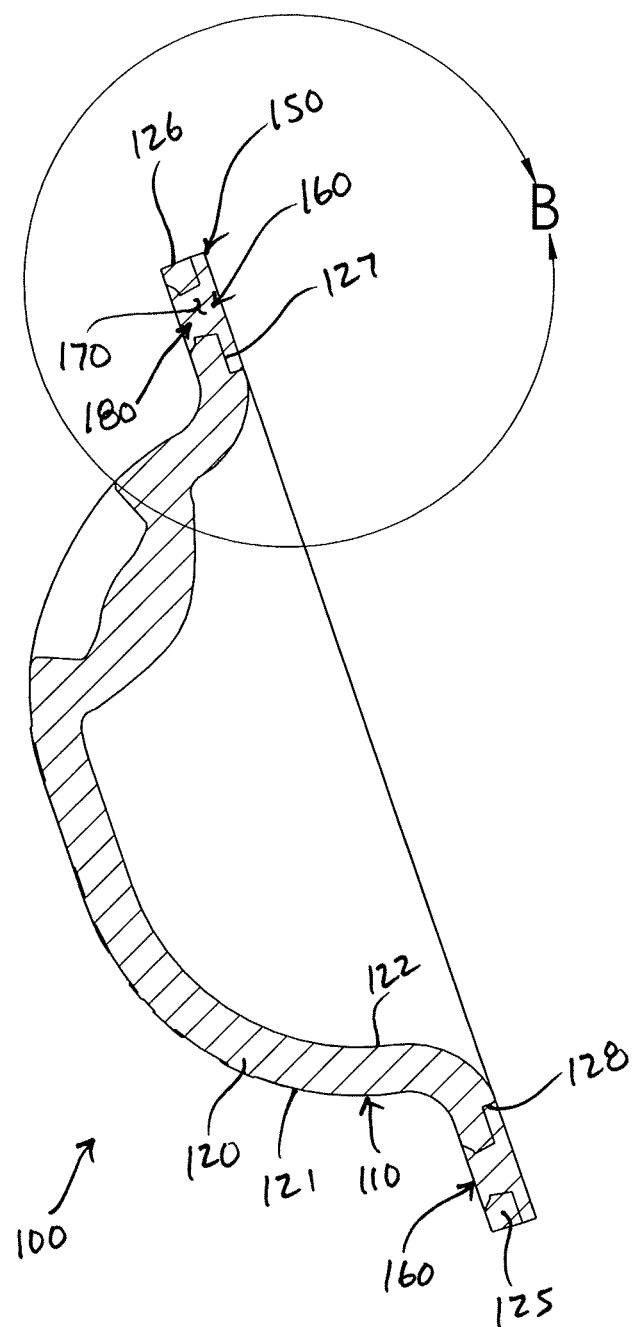
FIG. 3 is a section view along line 3-3 of FIG. 2 illustrating the cap capping a lubricating oil reservoir of a roller.

Referring to FIGS. 1-3 in relevant part, cap assembly 100 includes cap 110 and heat resistant shield 150. Cap 110 is fashioned of a first material, shield 150 is fashioned of a second material, and the second material is different from the first material and is more thermally resistant than the first material of cap 110 enabling shield 150 to thermally shield cap 110. Cap 110 is broad and disc-shaped and of substantial construction, and is formed of the first material, which is a strong, hard, impact resistant, temperature resistant, chemical resistant, and non-conductive material. The first material of cap 110 is a first plastic material, preferably a transparent polyamide 12 amorphous thermoplastic, i.e. transparent PA 12 grade amorphous thermoplastic, having an inherent resistance to chemical agents, cracking under stress, and which has an inherent heat deflection temperature, i.e. a thermal resistance, of approximately 275 degrees Fahrenheit. The terms "heat deflection temperature" and "thermal resistance" each mean a heat property and a measurement of a temperature difference by which the material of cap 110 resists a heat flow deflection in response exposure to a heat flow. Cap 110 is a single unit molded of the first plastic material and is, therefore, a unitary body of the first plastic material.

The second material of shield 150 is strong, hard, impact resistant, temperature resistant, chemical resistant, and non-conductive. The second material of shield 150 is a second plastic material that is different from the first plastic material of cap 110 and that is more thermally resistant than the first plastic material of cap 110 enabling shield 150 to thermally shield cap 110. The second plastic material of shield 150 is a glass fiber-reinforced polyamide 6/6 amorphous thermoplastic, i.e. a glass fiber-reinforced PA-6/6 grade amorphous thermoplastic, having an inherent resistance to chemical agents, cracking under stress, and which has an inherent heat deflection temperature, i.e. a thermal resistance, of approximately 400 degrees Fahrenheit. The terms "heat deflection temperature" and "thermal resistance" each mean a heat property and a measurement of a temperature difference by which the material of shield 150 resists a heat flow deflection in response exposure to a heat flow. Shield 150 is a single unit molded of the second plastic material and is, therefore, a unitary body of the second plastic material.

Figure 4:
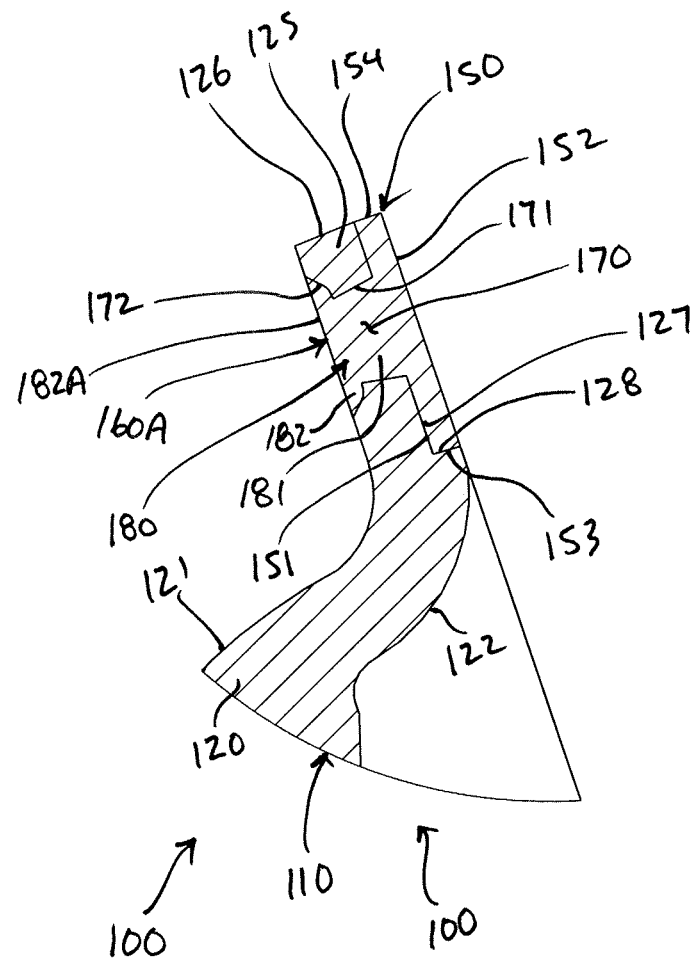
FIG. 4 is an enlarged view of circled area B of FIG. 3.

Cap 110 is a sealing body 120 that includes an outer face or side 121 and an opposed inner face or side 122 that meet outwardly from the geometric center of cap 110 at an outer perimeter extremity, which, in the present embodiment, is continuous marginal edge 126 of a circular perimeter or perimetric flange 125. Flange 125 terminates outwardly with continuous marginal edge 126. Sealing body 120 has a substantially uniform thickness extending between outer and inner sides 121 and 122. In the present embodiment, sealing body 120 has a thickness extending between outer and inner sides 121 and 122 in a range of approximately 4-9 millimeters. In FIGS. 3 and 4, the inner side 122 of cap 110 at flange 125 defines a continuous, recessed, annular shield-receiving area or seat 127. In other words, continuous, recessed, annular shield-receiving area or seat 127 is formed in inner side 122 of cap 110 at flange 125. Seat 127 is continuous, circular, and has a length, which is the length of the circle or perimetric shape of seat 127. Seat 127 extends inwardly from marginal edge 126 of cap 110 to endwall 128.

Sealing body 120 has a bulged part, the part of sealing body 120 that bulges outwardly from perimetric flange 125 to the geometric center of sealing body 120, characterized in that outer and inner sides 121 and 122 of sealing body 120 are convex and concave, respectively, extending from perimetric flange 125 to the geometric center of sealing body 120. A depressed part the bulged part of sealing body 120, which is a depression 130 encircled by a raised rim 131, is formed in sealing body 120 adjacent to perimetric flange 125. Depression 130 and raised rim 131 are formed in sealing body 120 in outer side 121 of sealing body 120. Depression 130 formed in outer side 121 of sealing body 120 is encircled by raised rim 131. In FIG. 2, port 134 is formed in sealing body 120 at depression 130 formed in sealing body 120. Port 134 extends through sealing body 120 at depression 130 from outer face 121 of sealing body 120 to inner face 122 of sealing body 120. Port 134 is inwardly threaded to enable it to threadably receive a plug to close and seal port 134.

And so cap 110 is fashioned of the first material, shield 150 is fashioned of the second material, the second material of shield 150 is different from the first material of cap 110 and is more thermally resistant than the first material of cap 110 enabling shield 150 to thermally shield cap 110, the first material is the first plastic material, that is transparent, the second material is the second plastic material, the second plastic material is different from the first plastic material, cap 110 is a single unit molded of the first plastic material, and shield 150 is a single unit molded of the second plastic material. Because first plastic material of cap 110 is less thermally resistant compared to shield 150, the first material of cap 110 can soften and deflect when exposed to the inherent heat generated by a roller of a tracked vehicle. To prevent this, the more thermally resistant shield 150 is applied to cap 110 to enable shield 150 to withstand and to shield cap 110 from the inherent heat generated by the roller of the tracked vehicle.

Referring to FIG. 3, shield 150 is a continuous, circular, perimeter or perimetric body having a length, which is the length of the circle or perimetric shape of shield 150. Shield 150 has opposed inner and outer sides 151 and 152, and opposed inner and outer perimeter edges 153 and 154 extending therebetween. Inner and outer sides 151 and 152 are flat surfaces that are parallel relative to each other. Shield 150 relates to seat 127 formed by inner side 122 of flange 125 in that seat 127 accepts shield 150. Accordingly, the annular shape a length of seat 127 corresponds to the annular shape and length of shield 150. In FIG. 3, shield 150 is applied to seat 127. Inner side 151 of shield 150 is in direct contact against inner side 122 of seat 127 of flange 125, outer side 152 of shield 150 faces outwardly in the opposite direction and toward the end of the reservoir to be capped by cap assembly 110, inner perimeter edge 153 abuts and is in direct contact against annular endwall 128 of seat 127, and outer perimeter edge 154 is flush with marginal edge 126 of cap 110.

In FIGS. 1-3, in cap assembly 100 anchor assemblies 160 anchor and secure shield 150 to inner side 122 of cap 110, namely, to seat 127 formed in inner side 122 of flange 125 of cap 110. Anchor assemblies 160 are equally spaced-apart concurrently along the lengths of flange 125 and shield 150, respectively, and are each positioned between endwall 128 of seat 127 and marginal edge 126 of cap 110, and between inner and outer perimeter edges 153 and 154 of shield 150. Cap assembly 100 includes a sufficient number of anchor assemblies 160 to ensure that shield 150 is anchored securely in place to inner side 122 of cap 110, to seat 127 of inner side 122 of cap 110. In the present embodiment, there are eight anchor assemblies 160, and less or more can be used consistent with this disclosure depending on the relative size of a cap assembly constructed and arranged in accordance with the principle of the invention. Anchor assemblies 160 are identical. Accordingly, one anchor assembly, denoted at 160A in FIG. 4, will now be discussed, with the understanding that the ensuing discussion of anchor assembly 160A applies in every respect to each of anchor assemblies 160.

In FIG. 4, anchor assembly 160A includes two main parts, namely, countersunk hole 170 of cap 110 and counterpin 180 of shield 150. Counterpin 180 is an engagement element, a male engagement element, of anchor assembly 160A, and countersunk hole 170 is a complemental engagement element, a female engagement element, of anchor assembly 160A. Countersunk hole 170 of cap 110 is formed through the thickness of flange between endwall 128 of seat 127 and marginal edge 126 of cap 110. Counterpin 180 of shield 150 is between inner and outer perimeter edges 153 and 154 of shield 150. Countersunk hole 170 includes hole 171 and countersink 172, and counterpin 180 includes shank 181 and counterhead 182. Hole 171 extends from inner side 122 of cap to countersink 172, and countersink 172 extends from hole 171 to outer side 121 of cap 110. More specifically, hole 171 extends from inner side 122 of seat 227 of flange 125 of cap 110 to countersink 172, and countersink 172 extends from hole 171 to outer side 121 of flange 125 of cap 110. Shank 181 extends outwardly from inner side 151 to of shield 150 to counterhead 182. In cap assembly 100, shank 181 extends through hole 171 from inner side 151 of shield 150 counterhead 182, and counterhead 182 is seated in countersink 172 and extends through countersink 172 from shank 181 to its outer end 182A, which is flush with outer side 121 of flange 125 of cap 110. Shank 181 and counterhead 182 that define the male engagement element of anchor assembly 160A fit completely within and completely fill hole 171 and countersink 172, respectively, that define the complemental engagement element of anchor assembly 160A, firmly anchoring shield 150 to inner side 122 of cap 110, specifically to seat 127 of inner side 122 of flange 125. Counterpins 160 are part of shield 150, and cooperate together to firmly anchor shield 150 to inner side 122 of cap 110, specifically to seat 127 of inner side 122 of flange 125.

As previously mentioned, shield 150 is a single unit molded of the second plastic material. Since counterpins 160 are part of shield 150, which is integrally formed, they are part of the single unit of the second plastic material that defines shield 150. Shield 150 is preferably molded into recess 127 and counterpins 160 are formed and molded in the respective countersunk holes 170 at the same time. Shield 150 can be molded and formed on cap 110 via injection molding through countersinks 172 and to recess 127, or onto recess 127 and into countersunk holes 170.

Outer side 152 of shield 150 is the contact surface of cap assembly 100 that is applied to the open end of the lubricating oil reservoir of a roller of a tracked vehicle when cap assembly 100 is applied to open end of the lubricating oil reservoir of a roller of a tracked vehicle. In the use of cap assembly 100, outer side 152 of shield 150 of cap assembly 100 is applied to a gasket applied to the open end of the lubricating oil reservoir of a roller of a tracked vehicle and cap assembly 100 is secured removably in place, such as with clamps, nut-and-bolt fasteners, or the like. The gasket between outer side 152 of shield and the open end of the lubricating oil reservoir is a sealing gasket to provide a fluid impervious seal. So installed, and with an appropriate plug sealed to port 134, cap 110 spans and closes and seals the open end of the lubricating oil reservoir. Having so secured cap assembly 100 in place to the open end of the reservoir of the given roller of the tracked vehicle, the tractor in this example, a volume of a lubricating applied to the reservoir in the conventional manner and the given roller is then prepared and ready for use in the operation of tracked vehicle in the normal manner. The transparency of the bulged part of sealing body 120 of cap 110, the part of sealing body 120 that bulges outwardly from perimetric flange 125 to the geometric center of sealing body 120, enables a skilled worker to see therethrough without interference from shield 150 to enable the contents of the lubricating oil reservoir to be visually inspected through the transparency of the bulged part of sealing body 120 of cap 110 for lubricating oil level and quality monitoring when cap assembly 100 is installed on the open end of the lubricating oil reservoir of the roller of the tracked vehicle without interference from shield 150, according to the invention. Because the inherent thermal resistance of the plastic material of shield 150 is sufficiently greater than the inherent thermal resistance of the plastic material of cap 110 to enable shield 150 to withstand the inherent heat generated by the roller of the tracked vehicle, shield 150 between the open end of the lubricating oil reservoir and the inner side of cap 110, specifically recess 127 of inner side 122 of cap 110, disables cap 110 of cap assembly 100 from directly contacting the open end of the lubricating oil reservoir, and the gasket applied between the open end of the lubricating oil reservoir, and sufficiently thermally isolates cap 110 to which shield 150 is attached from the inherent heat generated by the roller during the operation of the tracked vehicle disabling the plastic material of cap 110 to which shield 150 is applied from softening/melting from the inherent heat generated by the roller of the tracked vehicle, according to the principle of the invention, thereby preventing oil leakage between the open end of the lubricating oil reservoir and the plastic material of cap 110 to which shield 150 is applied, namely, inner side 122 of seat 127 of flange 125 of sealing body 120. Since counterpins 160 are more thermally resistant than cap 110, being made of the second material different from the first material of cap 110, pins 160 are enabled to withstand the inherent heat generated by the roller of the tracked vehicle for disabling pins 160 from softening or melting thereby disabling the anchoring between counterpins 160 and the corresponding countersunk holes 170 from failing from heat exposure from the roller of the tracked vehicle which could otherwise cause shield 150 to separate from cap 110, according to the invention.

In the normal and customary operational position of the roller, the lubricating oil reservoir is horizontal and its open end is vertical, and cap 110 is vertically disposed such that sealing body 120 extends vertically across the open end of the lubricating oil reservoir when cap assembly 100 is applied to the open end of the lubricating oil reservoir. As the volume of the lubricating oil is readily and easily visualized through sealing body 120 without interference from shield 150 as discussed above, the level and quality of the lubricating oil can easily be visually inspected through sealing body 120. Port 134 is useful for replenishing and replacing lubricating oil in the reservoir. To replenish the volume of lubricating oil when needed, the plug can be detached, unthreaded, from port 134 to open port 134 to enable replenishing oil to be applied to the reservoir through the open port 134, after which port 134 is reclosed by reinstalling, threading, the plug to port 134. To replace the volume of lubricating oil in the reservoir with a fresh volume of a lubricating oil, port 134 is opened by detaching the plug from port 134, the volume of lubricating oil is withdrawn from the reservoir through open port 134, a fresh volume of a lubricating oil is applied to the reservoir through open port 134, and port 134 is reclosed by reinstalling the plug to port 134. These processes are repeated as needed.

According to the principle of the invention, a lubricating oil maintenance cap assembly 100 includes cap 110 including outer side 121 and inner side 122, shield 150, anchor assemblies 160, shield 150 applied to inner side 122 of cap 110, and anchor assemblies 160 anchoring shield 150 to cap 110. Cap 110 is fashioned of the first material, shield 150 is fashioned of the second material, and the second material is different from the first material and is more thermally resistant than the first material enabling shield 150 to thermally shield inner side 122 of cap 110. The first material is the first plastic material, the second material is the second plastic material, and the second plastic material is different from the first plastic material. Cap 110 is a single unit molded of the first plastic material, and shield 150 is a single unit molded of the second plastic material. Each anchor assembly 160 includes countersunk hole 170, one engagement element of an engagement pair, of cap 110 and counterpin 180, the other engagement element of the engagement pair, of shield 150, countersunk hole 170 includes hole 171 and countersink 172, counterpin 180 includes shank 181 and counterhead 182, hole 171 extends from inner side 122 of cap 110 to countersink 172, countersink 172 extends from hole 171 to outer side 121 of cap 110, shank 181 extends through hole 171 from shield 150 to counterhead 182, and counterhead 182 is seated in countersink 172. In a particular embodiment, recessed seat 127 is formed in inner side 122 of cap 110, shield 150 is applied to recessed seat 127, and anchor assemblies 160 anchor shield 150 to recessed seat 127. In this embodiment, each anchor assembly 160 includes countersunk hole 170, one engagement element of an engagement pair, of cap 110, counterpin 180, the other engagement element of the engagement pair, of shield 150, countersunk hole 170 includes hole 171 and countersink 172, counterpin 180 includes shank 181 and counterhead 182, hole 171 extends from inner side 122 of recessed seat 127 to countersink 172, countersink 172 extends from hole 171 to outer side 121 of cap 110, shank 181 extends through hole 171 from shield 150 to counterhead 182, and counterhead 182 is seated in countersink 172.

The invention has been described above with reference to illustrative embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A lubricating oil maintenance cap assembly, comprising:
    a cap including an outer side, and an inner side;
    a shield including;
    anchor assemblies;
    the shield is applied to the inner side of the cap, and the anchor assemblies anchor the shield to the cap; and
    each said anchor assembly comprises a countersunk hole of the cap and a counterpin of the shield, the countersunk hole includes a hole and a countersink, the counterpin includes a shank and a counterhead, the hole extends from the inner side of the cap to the countersink, the countersink extends from the hole to the outer side of the cap, the shank extends through the hole from the shield to the counterhead, and the counterhead is seated in the countersink.

2. The lubricating oil maintenance cap assembly according to claim 1, wherein the cap is fashioned of a first material, the shield is fashioned of a second material, and the second material is different from the first material and is more thermally resistant than the first material enabling the shield to thermally shield the inner side of the cap.

3. The lubricating oil maintenance cap assembly according to claim 2, wherein the first material is a first plastic material.

4. The lubricating oil maintenance cap assembly according to claim 3, wherein the second material is a second plastic material.

5. The lubricating oil maintenance cap assembly of claim 4, wherein the cap is a single unit molded of the first plastic material, and the shield is a single unit molded of the second plastic material.

6. A lubricating oil maintenance cap assembly, comprising:
    a cap including an outer side, and an inner side having a recessed seat;
    a shield;
    anchor assemblies;

the shield is applied to the recessed seat, and the anchor assemblies anchor the shield to the recessed seat; and each said anchor assembly comprises a countersunk hole of the cap and a counterpin of the shield, the countersunk hole includes a hole and a countersink, the counterpin includes a shank and a counterhead, the hole extends from the recessed seat of the cap to the countersink, the countersink extends from the hole to the outer side of the cap, the shank extends through the hole from the shield to the counterhead, and the counterhead is seated in the countersink.

7. The lubricating oil maintenance cap assembly according to claim 6, wherein the cap is fashioned of a first material, the shield is fashioned of a second material, and the second material is different from the first material and is more thermally resistant than the first material enabling the shield to thermally shield the inner side of the cap.

8. The lubricating oil maintenance cap assembly according to claim 7, wherein the first material is a first plastic material.

9. The lubricating oil maintenance cap assembly according to claim 8, wherein the second material is a second plastic material.

10. The lubricating oil maintenance cap assembly of claim 9, wherein the cap is a single unit molded of the first plastic material, and the shield is a single unit molded of the second plastic material.

\* \* \* \* \*